June 3, 1947.   R. D. HICKOK   2,421,504
INDICATING DIAL FOR PHOTOELECTRIC LIGHT METERS
Filed Feb. 1, 1946
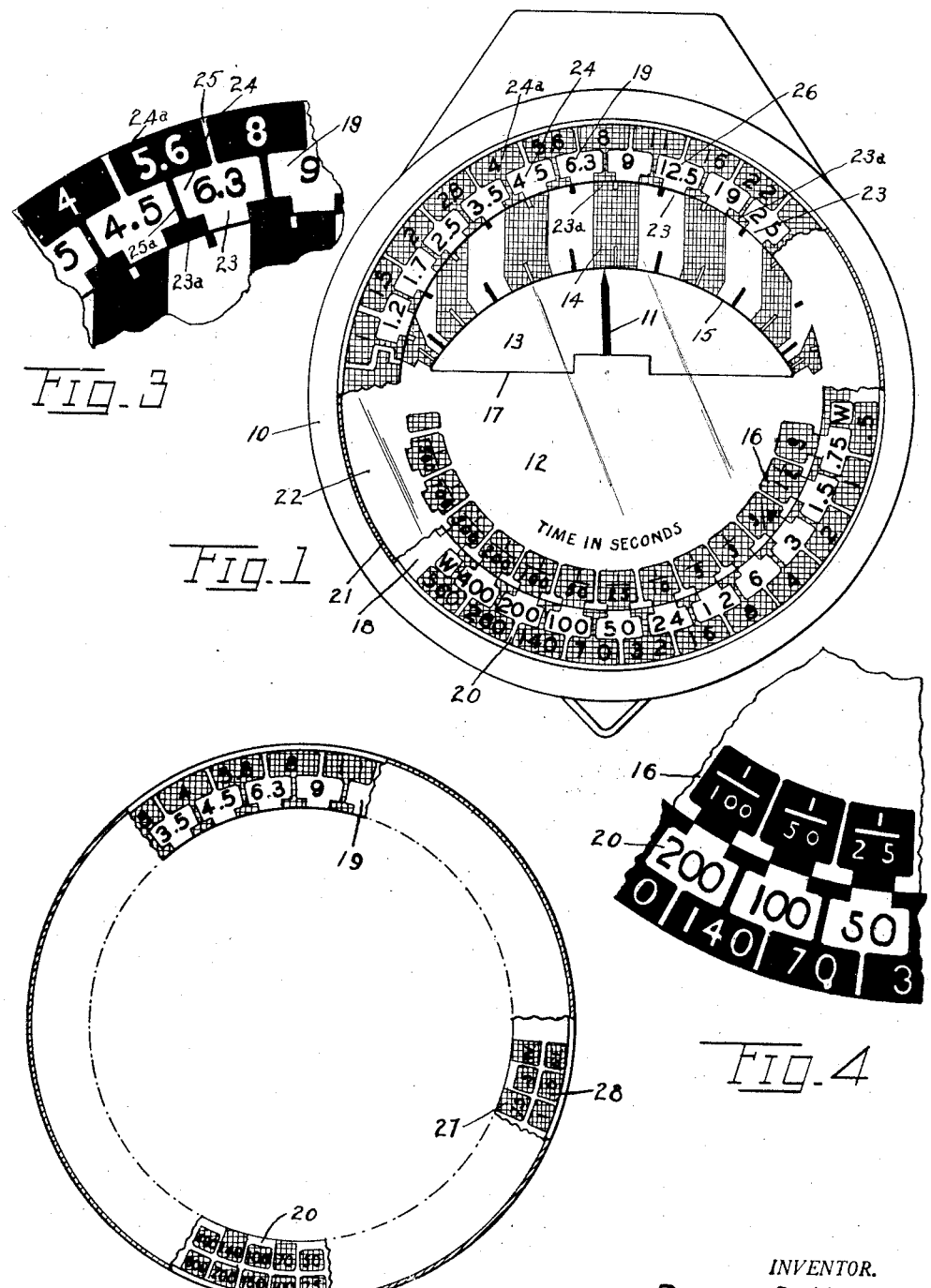
INVENTOR.
ROBERT D. HICKOK
BY
Hyde, Meyer, Baldwin & Doran
ATTORNEYS Patented June 3, 1947

2,421,504

UNITED STATES PATENT OFFICE 2,421,504

INDICATING DIAL FOR PHOTOELECTRIC LIGHT METERS

Robert D. Hickok, Bratenahl, Ohio, assignor to Cleveland Patents, Incorporated, a corporation of Ohio Application February 1, 1946, Serial No. 644,749

9 Claims. (Cl. 235—64.7)

This invention relates to exposure meters for use in photography and more particularly to meters in which a pointer actuated by a light sensitive cell moves to various positions in accordance with variations in light intensity. The invention has to do with the scales and indicia associated with said pointer, by means of which the user is enabled to determine the size of lens stop opening and time of exposure which together, with a particular film, provide the desired exposure under the existing conditions. The invention is an improvement upon the subject matter of Letters Patent No. 2,190,159 granted February 13, 1940, to F. Loewenberg for Exposure meter, to which reference may be had if desirable or necessary.

One object of the invention is to provide an improved form and arrangement of dial scale markings by means of which greater subdivision of the scale is possible, without reduction in size of the value identifying legends or indicia thereon.

Another object is to improve the form and character of the scale subdivisions and the arrangement of the legend bearing areas associated therewith in such manner as to provide increased emphasis for each subdivision and more fully distinguish it from its neighbors, thereby making the instrument easier to read and to interpret and facilitating registration of scale divisions with each other by scale adjustment.

Still another object is to provide improved computing and indicating means for meters of the class described, which is so arranged as to simplify setting or adjustment of the instrument; which enables more accurate determination of values to be accomplished by interpolation beyond that heretofore possible; and in which the scale divisions and markings provide such increased contrast as to considerably improve the ability to read and interpret them.

Further objects of the invention in part are obvious and in part will appear more in detail hereinafter.

In the drawings, which represent one suitable embodiment of the invention,

Fig. 1 is a plan view of the complete meter, with parts broken out;

Fig. 2 is a plan view of the adjustable ring, and showing a modification;

Fig. 3 is a similar view, on a larger scale, of a portion of the adjustable ring and the stationary field with which it cooperates; and Fig. 4 is a similar enlarged view of another portion of the ring and its cooperating stationary scale.

The instrument as a whole may be of any suitable form or shape and may embody any form or character of internal operating mechanism, and thus requires no extended description. For example, it may be of the same general form and arrangement as that shown and described in the Loewenberg patent above referred to, to which reference may be had for a more complete description. It is sufficient here to say that the instrument shown includes a hollow body or casing 10 in the chamber of which is mounted a light sensitive cell (not shown) operatively connected to cause a needle or pointer 11 to travel back and forth, as by swinging motion, in response to variations in the intensity of light rays permitted to reach the cell through the usual window or opening at one end A of the casing. Above the pointer a field member in the form of a circular stationary plate 12 is rigidly fastened to the casing, said plate having a segmental opening 13 through which the pointer is visible in all of its various positions. One semicircular half of the plate 12 (the upper half in Fig. 1) has its surface provided with a scaled field 14 bounded on the inside by the curved edge 15 of opening 13, while the other or lower imperforate half of the plate is provided with an exposure time value scale 16 extending along its curved outer edge, said lower half of the plate being bounded on the inside by the straight chordal edge 17 of the opening 13.

Above the field member 12, and circumferentially encompassing it, is a ring member 18, of generally washer form, provided on one of its circumferential halves (the upper one in Fig. 1) with a lens stop or aperture indicating scale 19 and on the other half with a film speed indicating scale 20. Ring 18 is concentric with the circular plate 12 and is also rotatably adjustable around and with reference to it about their common central axis. For this purpose the ring is usually attached to a sleeve-like annulus 21 removably and rotatably mounted in the casing and which may also carry the cover glass or window 22, as is usual.

Scales 14 and 19 are mutually cooperative. So, also, are scales 16 and 20. Each scale is subdivided or graduated by markings along its edge, to provide a series of segments or divisions which are of uniform length circumferentially of the dial. Thus, in any position of the ring where segments on two cooperating scales register, there is complete and exact registration throughout the length of all four scales. To facilitate setting of the ring to such a position each scale, along its edge, has its surface provided with a series of long narrow rectangular blocks 23, 23a, one for each segment. To more readily emphasize and distinguish the several blocks from each other they are so arranged as to provide contrast, as by the use of contrasting colors, such as white for blocks 23 and black for blocks 23a. Other colors, or other contrasting surface appearances may be employed by the use of appropriate differing materials for the field and ring segments, or by the application of appropriate differing coating materials or surface ornamentation thereto. In Fig. 1 of the drawings the blocks on scales 16, 19, and 20 are alternately white (23) and black (23a), first one then the other, while on the field scale 14 they similarly alternate, but first two of one color, then two of another color, and so on. Either arrangement is permissible.

Each subdivision of each scale, excepting possibly those on the field scale 14, has its several subdivisions appropriately identified with their respective values by the application to its blocks of identifying legends 26, here Arabic numerals, although any characters may be employed. The manner of identification is of special, peculiar and ingenious form well calculated to further promote distinction between subdivisions and at the same time utilize identifying characters of relatively large size, easily readable, and retain subdivision into small fractions of the full scale, smaller than heretofore possible with the same size type or other characters.

Referring to the aperture scale 19, Fig. 3, for example, as representative of one suitable arrangement, the contrast here is between black and white, such as by the application of black enamel to the white surface of an aluminum plate. Each block has appendant thereto, an enlarged area in the form of a flag 24 or 24a, and an associated stem 25 or 25a. On these flags are placed the identifying legends or characters 26, which may be of relatively large size on account of the increased area available by the use of flags. The flags 24a and stems 25a are black, to correspond with the black of their blocks 23a, while flags 24 and stems 25 are white. Also, and importantly, the flags are arranged in two concentric rows, all black flags in one row and all white in the other. Thus stems 25a lie between their blocks and flags, while stems 25 lie beyond their flags. Further, the identifying legends or characters 26 in all cases are made to contrast with the flag or surface on which they appear, as white on black, or vice versa.

On time scale 16, Fig. 1, the black blocks alone have flags or extended areas, and the white blocks have stems, and identifying legends are applied only to the black flags, the values of intervening white blocks being ascertained or understood mentally by interpolation, although even here the same arrangement may be employed as on scale 19.

On film speed scale 20, Fig. 1, the well known Weston scale is employed to identify emulsion speed values, the arrangement of the blocks, flags and stems being like employed on scale 19.

It is not necessary to use extended areas in the form of flags on all scales. For example, the field scale 14 requires no identifying legends, and while separate blocks or segments are necessary for subdivision and are here employed, with contrasting colors, the blocks are made continuous with long stripes which extend to the curved edge 15 of opening 13, along which the pointer travels. Also Fig. 2 illustrates the film speed scale 20 as provided with two rows of legends, one marked 27 being those of the Weston scale, and those marked 28 being those of the General Electric scale, enabling either scale to be employed in setting, computing or interpreting the dial.

In use of the instrument, the user, of course, is assumed to know the speed value of the emulsion or film which he is exposing. From experience, and with due regard for existing conditions, he preselects his time of exposure or shutter speed and manually presets the scales to the appropriate position, by turning annulus 21 and the ring 18 which it carries until the proper exposure time block on scale 16 registers with or is opposite the proper film speed block on scale 20. In Fig. 1 the parts have been set for use with a relatively high speed film having a rating of 100 and with an exposure of 1/50 of a second.

Now the instrument is pointed toward the scene or object to be photographed, in the usual manner, pointer 11 promptly moving to a position, such as that shown, depending upon the intensity of the light rays at the time.

The operator now looks at the dial, and without further operation, adjustment or calculation, and without cross reference to tables or the like, reads directly, upon scale 19, the size of aperture or lens stop necessary to produce proper exposure, i. e., F stop 8 in the example shown. The size of that aperture, of course, is indicated by the legend, on scale 19, for that block which is opposite to, or in registration with, the division on the field scale 14 where the pointer has come to rest.

So long as the time of exposure remains the same, no adjustment of ring 18 is required, and the size of lens aperture is read directly, according to the position of the pointer.

Should it be desired to operate the camera with one selected lens opening, say stop F8, regardless of light conditions, then the operator points the meter at the object, adjusts ring 18 until the block for stop F8 on scale 19 lies opposite that segment of the field scale 14 to which the pointer is directed, and then finds on scale 16, opposite to the legend of proper film speed on scale 20, the appropriate time of exposure.

Contrast in appearance between adjacent blocks and adjacent flags or other enlarged areas, together with the increased size of legends employed, as well as other features described, all contribute to make the meter very legible and easy to set or adjust and interpret.

It should be noted, in considering the drawings, that in Figs. 1 and 2 the contrasting colors, black and white, appearing on the field, blocks, flags and stems, have been represented conventionally, in accordance with standard drafting practice, while in Figs. 3 and 4 they are shown in their actual colors, black and white, as they would appear in an actual meter. Fig. 4 illustrates the same arrangement of scales 16, 20 shown in Fig. 1.

Other advantages of the invention than those referred to will readily be apparent to those skilled in the art.

What I claim is:

1. A computing and indicating dial for use with a pointer which moves to various positions in accordance with variations in light intensity, said dial comprising a stationary full circle field member, one half of the surface of which is provided with a series of light intensity indicating scale divisions having blocks over which the pointer travels and the opposite half with a series of blocks each provided with indicia of exposure time in seconds or fractions thereof, and a ring member concentric with and encompassing the field member and rotatably adjustable around their common center, one half, circumferentially, of the surface of said ring member being provided with a series of lens stop indicating blocks for cooperation with said light intensity indicating scale divisions and the other half with a series of film speed indicating blocks for cooperation with said exposure time indicating blocks, said scale divisions and blocks being of identical length, circumferentially of the dial, some of the blocks in at least one of the said series being each provided with an associated expanded flag longer than the block itself and bearing an indicating legend, such expanded flags each providing increased area for its associated block and enabling the legend which it bears to be of maximum size and visibility.

2. A computing and indicating dial for use with a pointer which moves to various positions in accordance with variations in light intensity, said dial comprising a stationary full circle field member, one half of the surface of which is provided with a series of light intensity indicating scale divisions having blocks over which the pointer travels and the opposite half with a series of blocks each provided with indicia of exposure time in seconds or fractions thereof, and a ring member concentric with and encompassing the field member and rotatably adjustable around their common center, one half, circumferentially, of the surface of said ring member being provided with a series of lens stop indicating blocks for cooperation with said light intensity indicating scale divisions and the other half with a series of film speed indicating blocks for cooperation with said exposure time indicating blocks, said scale divisions and blocks being of identical length, circumferentially of the dial, alternate blocks in each of the said series having such character as to present substantial contrast and thus emphasize each block and distinguish it from its neighbors, thereby facilitating registration of desired blocks by adjustment of said ring member and assisting in interpretation of their relations in various positions of the pointer.

3. A computing and indicating dial for use with a pointer which moves to various positions in accordance with variations in light intensity, said dial comprising a stationary full circle field member, one half of the surface of which is provided with a series of light intensity indicating scale divisions having blocks over which the pointer travels and the opposite half with a series of blocks each provided with indicia of exposure time in seconds or fractions thereof, and a ring member concentric with and encompassing the field member and rotatably adjustable around their common center, one half, circumferentially, of the surface of said ring member being provided with a series of lens stop indicating blocks for cooperation with said light intensity indicating scale divisions and the other half with a series of film speed indicating blocks for cooperation with said exposure time indicating blocks, said scale divisions and blocks being of identical length, circumferentially of the dial, some of the blocks in at least one of the said series being each provided with an associated expanded flag longer than the block itself and bearing an indicating legend, such expanded flags each providing increased area for its associated block and enabling the legend which it bears to be of maximum size and visibility, alternate blocks in each of the said series having such character as to present substantial contrast and thus emphasize each block and distinguish it from its neighbors, thereby facilitating registration of desired blocks by adjustment of said ring member and assisting in interpretation of their relations in various positions of the pointer.

4. A computing and indicating dial of the character described in claim 2, alternate ones of said flags also having such character as to present substantial contrast similar to that between their cooperating blocks.

5. A computing and indicating dial of the character described in claim 2 the blocks of one of said series being provided each with a value indicating legend, such legends being arranged in two parallel rows, one row including those for the blocks of one appearance and the other row including those for the blocks of contrasting appearance, thus enabling the legends for all blocks to be of maximum size and visibility.

6. A computing and indicating dial of the character described in claim 1, each of said flags having characters like that of its associated block and thus further emphasizing and distinguishing each block from its neighbors.

7. A computing and indicating dial for use with a pointer which moves to various positions in accordance with variations in light intensity, said dial comprising a stationary full circle field member, one half of the surface of which is provided with a series of light intensity indicating scale divisions having blocks over which the pointer travels and the opposite half with a series of blocks each provided with indicia of exposure time in seconds or fractions thereof, and a ring member concentric with and encompassing the field member and rotatably adjustable around their common center, one half, circumferentially, of the surface of said ring member being provided with a series of lens stop indicating blocks for cooperation with said light intensity indicating scale divisions and the other half with a series of film speed indicating blocks for cooperation with said exposure time indicating blocks said scale divisions and blocks being of identical length, circumferentially of the dial, some of the blocks in one of said series being each provided with an associated expanded flag longer than the block itself and bearing an indicating legend, the flags for successive blocks along the series being arranged in staggered relation and in two concentric rows, the flag associated with each block providing increased area therefor and enabling the legend which it bears to be of maximum size and visibility.

8. A computing and indicating dial for use with a pointer which moves to various positions in accordance with variations in light intensity, said dial comprising a stationary full circle field member, one half of the surface of which is provided with a series of light intensity indicating scale divisions having blocks over which the pointer travels and the opposite half with a series of blocks each provided with indicia of exposure time in seconds or fractions thereof, and a ring member concentric with and encompassing the field member and rotatably adjustable around their common center, one half, circumferentially, of the surface of said ring member being provided with a series of lens stop indicating blocks for cooperation with said light intensity indicating scale divisions and the other half with a series of film speed indicating blocks for cooperation with said exposure time indicating blocks said scale divisions and blocks being of identical length, circumferentially of the dial, some of the blocks in one of said series being each provided with an associated expanded flag longer than the block itself and bearing an indicating legend, the flags for successive blocks along the series being arranged in staggered relation and in two concentric rows, the flag associated with each block providing increased area therefor and enabling the legend which it bears to be of maximum size and visibility, each of said flags having character like that of its associated block and thus enhancing the distinction of each block from its neighbors.

9. A computing and indicating dial for use with a pointer which moves to various positions in accordance with variations in light intensity, said dial comprising a stationary full circle field member, one half of the surface of which is provided with a series of light intensity indicating scale divisions having blocks over which the pointer travels and the opposite half with a series of blocks each provided with indicia of exposure time in seconds or fractions thereof, and a ring member concentric with and encompassing the field member and rotatably adjustable around their common center, one half, circumferentially, of the surface of said ring member being provided with a series of lens stop indicating blocks for cooperation with said light intensity indicating scale divisions and the other half with a series of film speed indicating blocks for cooperation with said exposure time indicating blocks said scale divisions and blocks being of identical length, circumferentially of the dial, some of the blocks in one of said series being each provided with an associated expanded flag longer than the block itself and bearing an indicating legend, the flags for successive blocks along the series being arranged in staggered relation and in two concentric rows, the flag associated with each block providing increased area therefor and enabling the legend which it bears to be of maximum size and visibility, alternate blocks in each of the said series having such character as to present substantial contrast and thus emphasize each block and distinguish it from its neighbors, thereby facilitating registration of desired blocks by adjustment of said ring member and assisting in interpretation of their relations in various positions of the pointer.

ROBERT D. HICKOK.